UNITED STATES PATENT OFFICE.

HERBERT ARTHUR COUCHMAN, OF BURTON-ON-TRENT, ENGLAND.

ARC-LAMP CARBON.

SPECIFICATION forming part of Letters Patent No. 672,032, dated April 16, 1901.

Application filed March 7, 1900. Serial No. 7,719. (No model.)

*To all whom it may concern:*

Be it known that I, HERBERT ARTHUR COUCHMAN, a subject of the Queen of Great Britain and Ireland, and a resident of Hillside, Shobnall road, Burton-on-Trent, in the county of Derby, England, have invented certain new and useful Arc-Lamp Carbons, (for which I have filed an application for patent in Great Britain, No. 1,869, bearing date January 30, 1900,) of which the following is a specification.

This invention consists of improvements relating to electric-arc lamps, my object being to increase the lighting effect obtainable from such lamps with a given expenditure of electrical energy and to render them more suitable for photographic printing and for general purposes.

My invention comprises the effective combination, with one or both of the ordinary carbon rods now employed for electric-arc lamps, of a core of such a composition as will increase the actinic and illuminating effect and cause the said core to become consumed by the electric current at the same rate as the carbon itself.

In applying my invention I form a central aperture through or nearly through the lower or negative carbon and fill the same with a core formed from hydraulic lime or a mixture of lime and silicate of alumina in the proportion of two parts of lime to one of silicate of alumina. The refractory lime in the said mixture serves to increase the actinic and illuminating effect, while the silicate of alumina serves as a fluxing material, which causes the complete core to become consumed uniformly with the consumption of the carbon. The substance is ground into a fine powder and is tightly packed in the interior of the carbon. On passing the current through the lamp provided with a hollow carbon that has been packed as described and striking the arc in the ordinary manner a light is produced of far greater intensity than can be obtained when using the same amount of current in the lamp fitted with ordinary carbons.

Instead of packing the aforesaid substance in one central longitudinal aperture in the carbon rod I may place it in two or more apertures extending along the rod and otherwise pack or combine it with the rod itself to produce the desired effect.

I am aware that proposals have been made to pack carbon rods for electric-arc lamps with plaster-of-paris, with ordinary white lime, and with other like materials for increasing the incandescence; but with such cores though the light is increased its steadiness and consistency cannot be maintained, and hence they have no practical utility; but with my core, formed from the mixture described, complete combustion takes place in the arc and the carbon and its core react upon each other and are consumed together.

Having thus described my invention, what I claim as new, and desire to secure by Letters Patent, is—

1. As an article of manufacture, a carbon for arc-lamps having a core composed of a refractory material and a fluxing material in the proportions of two parts of refractory material to one part of fluxing material, substantially as described.

2. As an article of manufacture, an arc-light carbon having a core composed of lime and silicate of alumina in substantially the proportion specified, substantially as described.

In witness whereof I have hereunto set my hand in presence of two witnesses.

HERBERT ARTHUR COUCHMAN.

Witnesses:
EDWARD MARKS,
HERBERT BOWKETT.